(12) United States Patent
Busbee

(10) Patent No.: US 11,541,595 B1
(45) Date of Patent: Jan. 3, 2023

(54) SYSTEMS AND METHODS OF FORMING STRUCTURES ON FLEXIBLE SUBSTRATES

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 178 days.

(21) Appl. No.: 16/369,048

(22) Filed: Mar. 29, 2019

Related U.S. Application Data

(60) Provisional application No. 62/650,564, filed on Mar. 30, 2018.

(51) Int. Cl.
| | |
|---|---|
| *B29C 64/00* | (2017.01) |
| *B29C 64/129* | (2017.01) |
| *B29C 64/307* | (2017.01) |
| *B33Y 40/20* | (2020.01) |
| *B33Y 99/00* | (2015.01) |
| *B29C 64/20* | (2017.01) |
| *B33Y 50/00* | (2015.01) |
| *B29C 64/40* | (2017.01) |

(Continued)

(52) U.S. Cl.
CPC ............ *B29C 64/129* (2017.08); *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B33Y 30/00* (2014.12); *B33Y 40/00* (2014.12); *B33Y 40/10* (2020.01); *B33Y 40/20* (2020.01); *B33Y 50/00* (2014.12); *B33Y 70/00* (2014.12); *B33Y 80/00* (2014.12); *B33Y 99/00* (2014.12); *B33Y 10/00* (2014.12)

(58) Field of Classification Search
CPC ........................... B29C 64/129; B29C 64/307
See application file for complete search history.

(56) References Cited

U.S. PATENT DOCUMENTS

| 2004/0094870 A1* | 5/2004 | Ueno | ................ B33Y 50/02 264/401 |
| 2014/0090962 A1* | 4/2014 | Butland | ................ B65G 15/42 198/844.1 |

(Continued)

*Primary Examiner* — Nicholas R Krasnow

(57) ABSTRACT

Embodiments related to systems and methods of forming structures on substrates (e.g., flexible substrates, fabrics, textiles, leathers) are disclosed. In some embodiments, a method of forming a structure on a substrate is provided. The method may involve submerging at least one surface of the substrate into a resin bath. The method may include patterning electromagnetic radiation through a window onto one or more regions of the substrate to polymerize the resin onto the one or more regions of the substrate. An alternative method may involve covering a surface of the substrate with a layer of polymeric powder. The alternative method may include directing electromagnetic radiation toward one or more regions on the surface of the substrate to heat the polymeric powder to form a layer on the surface of the substrate. A method of depositing an ultraviolet (UV)-curable material onto a substrate by a valve jetting process is also provided.

5 Claims, 6 Drawing Sheets

(51) Int. Cl.
*B29C 64/227* (2017.01)
*B33Y 80/00* (2015.01)
*B33Y 30/00* (2015.01)
*B29C 64/10* (2017.01)
*B33Y 40/00* (2020.01)
*B29C 64/255* (2017.01)
*B29C 64/245* (2017.01)
*B33Y 40/10* (2020.01)
*B29C 64/25* (2017.01)
*B29C 64/30* (2017.01)
*B29C 64/182* (2017.01)
*B29C 64/176* (2017.01)
*B29C 64/205* (2017.01)
*B33Y 70/00* (2020.01)
*B33Y 10/00* (2015.01)

(56) References Cited

U.S. PATENT DOCUMENTS

2017/0173892 A1* 6/2017 Steele ................ B29C 35/0805
2018/0065295 A1* 3/2018 Alves .................... B29C 64/129

* cited by examiner

SYSTEMS AND METHODS OF FORMING STRUCTURES ON FLEXIBLE SUBSTRATES

RELATED APPLICATIONS

This application claims priority under 35 U.S.C. § 119(e) to U.S. Provisional Patent Application Ser. No. 62/650,564, filed Mar. 30, 2018, and entitled "SYSTEMS AND METHODS OF FORMING STRUCTURES ON FLEXIBLE SUBSTRATES," which is incorporated herein by reference in its entirety for all purposes.

FIELD

Embodiments related to systems and methods of forming structures on substrates (e.g., flexible substrates, e.g., textiles, leathers) are disclosed.

BACKGROUND

Some methods of forming structures on substrates include but are not limited to bath photopolymerization, powder bed processes (e.g., multi-jet fusion processes, selective laser sintering), and valve jetting. Structures formed by such methods may include polymeric materials. Improved systems and methods of forming structures on substrates are needed.

SUMMARY

According to one aspect, a method is provided. The method may be a method of forming a structure on a flexible substrate. The method may involve submerging at least one surface of a flexible substrate into a resin bath. The method may involve patterning electromagnetic radiation through a window onto one or more regions of the flexible substrate to polymerize the resin onto the one or more regions of the flexible substrate.

According to another aspect, a method is provided. The method may be a method of forming a structure on a flexible substrate. The method may involve covering a surface of the flexible substrate with a layer of polymeric powder. The method may involve directing electromagnetic radiation toward one or more regions on the surface of the flexible substrate to heat the polymeric powder to form a layer of polymer attached to the surface of the flexible substrate.

According to another aspect, a method is provided. The method may be a method of forming a structure on a flexible substrate. The method may involve covering a surface of the flexible substrate with a layer of polymeric powder. The method may involve ink jetting a polymer-containing liquid into one or more regions of the powder layer (e.g., to bind the powder together).

In another aspect, a method is provided. The method may involve depositing an ultraviolet (UV)-curable material onto a flexible substrate by a valve jetting process.

In another aspect, a method is provided. The method may be a method for forming a three-dimensional structure. The method may involve bringing one or more surfaces of a substrate into contact with a resin that is at least in part electromagnetic radiation-curable. The method may involve patterning electromagnetic radiation into the resin to polymerize the resin onto the substrate. The method may involve continuing to pattern electromagnetic radiation into the resin to form a three-dimensional structure while simultaneously translating the substrate with respect to the electromagnetic radiation source in a translation direction.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
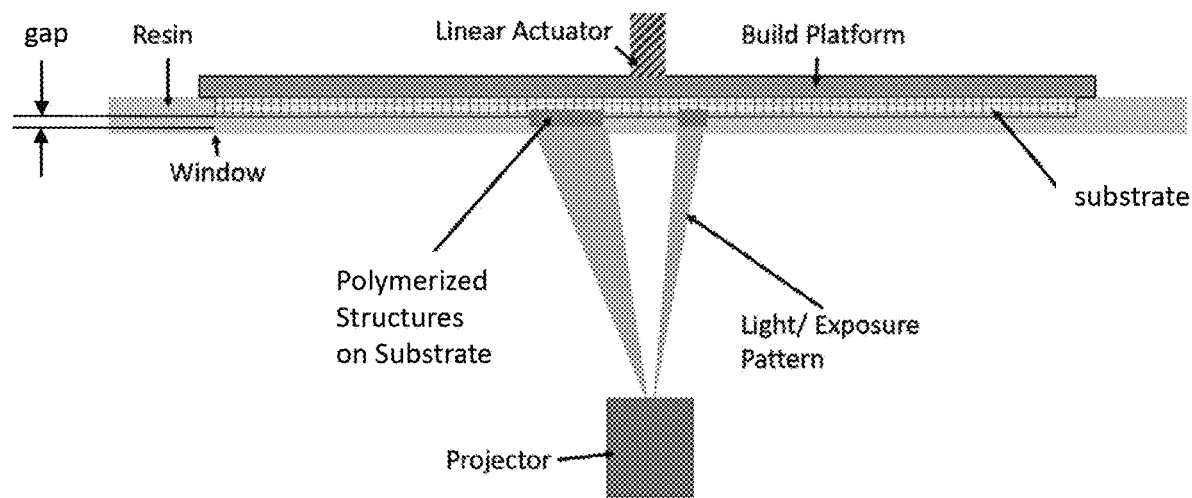
FIG. 1A is a schematic of an apparatus for photopolymerization onto a substrate, according to certain illustrative embodiments.

The Inventors have recognized limitations of prior systems and methods for attaching structures onto substrates (e.g., flexible substrates, fabrics). Substrates (e.g., flexible substrates, fabrics) such as textiles and leathers can be improved by including patterned structures (e.g., polymeric structures) attached to the substrates (e.g., flexible substrates, fabrics), but methods by which these structures are attached to the substrates (e.g., flexible substrates, fabrics) may present multiple steps and/or debonding or delamination issues. For example, some systems for forming structures on a base (e.g., prior forms of stereolithography apparatus (SLA)) may include a build platform directly onto which structures are built and cured from a resin. Similarly, prior printing technology using e.g. a binder jetting printer or a selective laser sintering machine involves directly building structures onto a build platform. Specifically, the Inventors recognized a problem that when a structure is made on (e.g., polymerized onto) a build platform, there may be difficulties removing the structure from the build platform, and/or there may be additional steps required to adhere the structure to a substrate (e.g., flexible substrate, fabric) (e.g., using an adhesive) to form a product. Once the structure is adhered to the substrate (e.g., flexible substrate, fabric), the structure may debond and/or delaminate (e.g., by the adhesive) from the substrate (e.g., flexible substrate, fabric) with use over time. The Inventors have recognized that it may be desirable to build a structure directly onto the substrate (e.g., flexible substrate, fabric) to form a product in a single step. The flexible substrate may be, as non-limiting examples, a textile, a shoe upper, a plastic film, or a leather.

According to one aspect, a method (e.g., comprising photopolymerization in a bath) of forming a structure on a substrate (e.g., flexible substrate, fabric, textile, leather) involving bath photopolymerization is provided. The method may involve submerging the substrate (e.g., flexible substrate, fabric) into a resin bath. The substrate (e.g., flexible substrate, fabric) may be a portion of a larger substrate (e.g., flexible substrate, fabric) article. The Inventors have improved upon technologies in the additive manufacturing industry that use electromagnetic radiation (e.g., light, e.g., having a wavelength in the infrared, ultraviolet, or other suitable wavelength range) to pattern the shape of solid structures using resins that are at least partially photopolymerizable.

The bath photopolymerization method may involve patterning electromagnetic radiation (e.g., light, e.g., infrared light, UV light) through a window onto one or more regions of the substrate (e.g., flexible substrate, fabric) to polymerize the resin onto the one or more regions of the substrate (e.g., flexible substrate, fabric). In some embodiments, the method involves patterning the electromagnetic radiation (e.g., light) from an electromagnetic radiation source (e.g., light source) through the window (e.g., FIG. 1A, FIG. 1B, FIG. 1C). In some embodiments, patterning the electromagnetic radiation (e.g., light) comprises using the window to pattern, wherein the window comprises a pattern of one or more portions transparent to electromagnetic radiation (e.g., light) in the wavelength range of the electromagnetic radiation source (e.g., light source), and one or more portions opaque to electromagnetic radiation (e.g., light) in the wavelength range of the electromagnetic radiation source (e.g., light source), such that exposure of a substrate (e.g., flexible substrate, fabric) to electromagnetic radiation (e.g., light) is patterned. In some embodiments, patterning the electromagnetic radiation (e.g., light) comprises using a pattern of electromagnetic radiation (e.g., light) from the electromagnetic radiation source (e.g., light source) comprising two or more beams of electromagnetic radiation (e.g., light) having a separation (e.g., light pattern of FIG. 1A, FIG. 1B, FIG. 1C). The method may involve selective electromagnetic radiation (e.g., light) exposure of a substrate (e.g., flexible substrate, fabric) (e.g., textile, leather) that is at least in part submerged in a resin, where the resin is at least in part UV-curable, to polymerize the resin onto a surface of the substrate (e.g., flexible substrate, fabric) such that the polymerized structure remains adhered to the substrate (e.g., flexible substrate, fabric) (e.g., textile, leather) without the use of additional adhesives.

The bath photopolymerization method may comprise attaching a substrate (e.g., flexible substrate, fabric) to a build platform, or holding the substrate (e.g., flexible substrate, fabric, textile) in contact with the build platform in tension, such that an additive photopolymerization process can be used to form structures that are directly adhered to the textile. In some embodiments, the method involves attaching a substrate (e.g., flexible substrate, fabric) to a build platform before submerging the substrate (e.g., flexible substrate, fabric) into the resin bath (e.g., FIG. 1A). In some embodiments, the method involves holding the substrate (e.g., flexible substrate, fabric) in contact with a build platform (e.g., through a tensioning mechanism, by attaching the substrate (e.g., flexible substrate, fabric) to the build platform). The method may involve holding the substrate (e.g., flexible substrate, fabric) taut (e.g., to rollers, e.g., FIG. 1B; e.g., to motorized rollers, e.g., FIG. 1C) during patterning and polymerizing. The method may involve rolling the substrate (e.g., flexible substrate, fabric) along the rollers after polymerizing the resin onto one or more regions of the substrate (e.g., flexible substrate, fabric) (e.g., FIG. 1C). The method may involve polymerizing the resin onto one or more second regions of the substrate (e.g., flexible substrate, fabric) (e.g., FIG. 1C). The bath photopolymerization method may involve setting a gap (e.g., FIG. 1A, FIG. 1B, FIG. 1C) between a surface of the substrate (e.g., flexible substrate, fabric) and a window positioned between an electromagnetic radiation source (e.g., light source) and the substrate (e.g., flexible substrate, fabric). In some embodiments, polymerizing the resin forms a polymerized layer attached to the one or more regions of the substrate (e.g., flexible substrate, fabric). In some embodiments, the resin is partially photocureable and partially heat-curable. In some embodiments, the resin comprises a mixture of functional groups comprising one or more of acrylate, methacrylate, vinyl, thiol, or alkene, or a combination thereof; and one or more functional groups comprising isocyanate, alcohol, epoxide, vinyl, silicone, methyl, or amine, or a combination thereof. The method may involve angling the window through which the electromagnetic radiation (e.g., light) is transmitted such that a gap between the window and a surface of the substrate (e.g., flexible substrate, fabric) increases along at least one axis of the substrate (e.g., flexible substrate, fabric) (e.g., FIG. 1C). In some embodiments, the method comprises moving the substrate (e.g., flexible substrate, fabric) further away from the window than a first gap and polymerizing another layer from the resin by patterning electromagnetic radiation (e.g., light) (e.g., by patterned electromagnetic radiation (e.g., light), by a patterned window) onto one or more regions of the substrate (e.g., flexible substrate, fabric). The method may comprise cyclically repeating steps of moving the substrate (e.g., flexible substrate, fabric) further away than a previous gap and polymerizing another layer until all designed layers have been polymerized. The method may involve changing a focal length of the electromagnetic radiation (e.g., light) such that polymerization of the resin penetrates into the substrate (e.g., flexible substrate, fabric) (e.g., interior to the surface of the substrate (e.g., flexible substrate, fabric), e.g., in embodiments with a woven fabric).

In some embodiments, the bath photopolymerization method may involve a process for continuous resin bath photopolymerization. In such embodiments, a substrate (e.g., a flexible substrate) onto which the resin is polymerized is moving (e.g., moving continuously) with respect to an electromagnetic radiation source (e.g., light source) directed onto a surface of the substrate (e.g., flexible substrate, e.g., fabric). In some embodiments, the substrate (e.g., flexible substrate) may comprise or may be a textile or fabric. In some embodiments, the substrate (e.g., flexible substrate) may comprise or may be a metal, a plastic, a metallic mesh, or a belt, or any suitable combination thereof. In some embodiments, the substrate (e.g., flexible substrate) may comprise or may be a composite such as a metal-coated plastic. In some embodiments, the substrate is a rigid platform that is translated during the continuous resin bath photopolymerization process. The method may comprise angling the window through which the light is transmitted such that a gap between the window and the surface of the substrate (e.g., flexible substrate, fabric) increases along at least one axis of the substrate (e.g., flexible substrate, fabric) (e.g., FIG. 1C). Alternatively, the method may comprise maintaining the window perpendicular to the direction of gravity, and angling the belt with respect to the window to result in a similar effect of an increasing gap along at least one axis of the substrate (e.g., as the substrate moves with respect to the window). This angling may be such that a gap between the window and the substrate (e.g., flexible substrate, fabric) continuously increases as the substrate (e.g., flexible substrate, fabric) is translated (or rolled). This angling may be used to polymerize structures and to increase the thickness of the structures as the substrate (e.g., flexible substrate, fabric) moves. Angling the window may be used as an alternative step to moving the resin bath up and down to build in height, and angling the window also may facilitate a continuous photopolymerization process. The continuous movement may also be advantageous for preventing the polymerized structure from becoming anchored to the window, since in some embodiments the movement would create a continuous shear force at the interface between the polymerized part and the window.

In some embodiments, a method for forming a three-dimensional structure is provided, the method comprising bringing one or more surfaces of a substrate into contact with a resin that is at least in part electromagnetic radiation-curable; patterning electromagnetic radiation into the resin to polymerize the resin onto the substrate; and/or continuing to pattern electromagnetic radiation into the resin to form a three-dimensional structure while simultaneously translating the substrate with respect to the electromagnetic radiation source in a translation direction. In some embodiments, the translation direction of the substrate is neither parallel nor perpendicular to the electromagnetic radiation projection direction (e.g., the translation direction is angled with respect to the window). In some embodiments, the substrate is a textile or a belt. The method may comprise positioning a blade so that the blade is configured to separate the three-dimensional structure from the substrate as the substrate is translated. The method may comprise translating the substrate in a loop such that the method repeats on at least a portion of the substrate. The method may comprise exposing the three-dimensional structure to ultraviolet light globally after the three-dimensional structure is formed, and removing the three-dimensional structure from the resin bath while the structure is being translated on the substrate. The method may comprise exposing the three-dimensional structure to a heat source globally after the three-dimensional structure is formed, and removing the three-dimensional structure from the resin bath while the structure is being translated on the substrate. The method may comprise submerging the substrate in a resin bath and patterning the electromagnetic radiation from above the resin bath. The method may comprise submerging the substrate from the top of the resin bath and patterning the electromagnetic radiation through a window below the resin bath. In some embodiments, the resin is partially electromagnetic radiation-curable and partially heat-curable. In some embodiments, the resin comprises both alkene functional groups and isocyanate functional groups. In some embodiments, the resin comprises both alkene functional groups and vinyl functional groups.

The bath photopolymerization method may involve removing the substrate (e.g., flexible substrate, fabric) from the build platform after polymerizing a structure onto the substrate (e.g., flexible substrate, fabric). The method may involve removing excess uncured resin from the substrate (e.g., flexible substrate, fabric), e.g., using compressed air or by a liquid washing step. The method may involve exposing the substrate (e.g., flexible substrate, fabric) to light to photopolymerize any residues and/or to post cure the structure. The method may involve performing secondary curing with heat, steam, or moisture to polymerize any non-UV-curable components of the structure. In some embodiments, post processes may occur as a continuous process. The substrate (e.g., belt) may continue rolling and carry the photopolymerized parts out of the resin bath and through additional post processes. In some embodiments, one of the post processes may be an automatic separation of the polymerized parts from the substrate. In some embodiments, the substrate may be a circular belt that continues back to the polymerization step after removal of the finished parts from the belt. The belt movement may not necessarily be a circle, but rather may move in a loop such that a single belt may move through the entire process repeatedly.

An illustrative bath photopolymerization method involves first attaching a substrate (e.g., fabric, textile, leather, plastic, metal, mesh) to a build platform. Then, the method proceeds with submerging a surface of the substrate (e.g., flexible substrate, fabric) into a resin bath and setting a gap between the surface of the substrate (e.g., flexible substrate, fabric) and a window positioned between the electromagnetic radiation source (e.g., light source) and the substrate (e.g., flexible substrate, fabric). Then, the method involves patterning electromagnetic radiation (e.g., light) onto one or more regions on the surface of the substrate (e.g., flexible substrate, fabric) to polymerize the resin in a first layer. The method then proceeds with moving the substrate (e.g., flexible substrate, fabric) further away from the window and polymerizing a second layer by patterning electromagnetic radiation (e.g., light) onto one or more regions on the surface of the substrate (e.g., flexible substrate, fabric). The method proceeds with cyclically repeating the steps of moving the substrate (e.g., flexible substrate, fabric) further away and polymerizing another layer until all layers have been polymerized. In some embodiments there are no discrete layers because the polymerization process is continuous and the gap size grows linearly. The method proceeds with removing the substrate (e.g., flexible substrate, fabric) from the build platform and removing excess uncured resin from the substrate (e.g., flexible substrate, fabric), e.g., using compressed air or by a liquid washing step. The method proceeds with exposing the substrate (e.g., flexible substrate, fabric) to electromagnetic radiation (e.g., light) to photopolymerize any residues and/or to post cure the structure. The method proceeds with performing secondary curing with heat, steam, or moisture to polymerize any non-UV-curable components of the structure.

In another aspect, a system to carry out bath photopolymerization methods described herein is provided. The system may have several main components, including but not limited to an electromagnetic radiation source (e.g., light source), a resin bath, a window and tank, a build platform and/or actuator.

In some embodiments, the system to carry out bath photopolymerization methods may comprise a electromagnetic radiation source (e.g., light source). The electromagnetic radiation source (e.g., light source) may comprise projector that can project an image, and/or a laser and a mirror that can raster a laser beam.

In some embodiments, the system to carry out bath photopolymerization methods may comprise a resin bath. The resin bath may comprise an acrylate or methacrylate functional oligomer resin with free radical photoinitiator, or other reactive system curable by heat, electromagnetic radiation (e.g., light), or other means. The resin bath may comprise a combination of a thermally curable resin (e.g., polyurethane), and an acrylate or methacrylate functional UV-curable oligomer and photoinitiator or other reactive system curable by electromagnetic radiation (e.g., light) or means other than heat.

In some embodiments, the system to carry out bath photopolymerization methods may comprise a window and tank. The window and tank may comprise a container that both holds resin and transmits electromagnetic radiation (e.g., light) used to cure the polymer.

In some embodiments, the system to carry out bath photopolymerization methods may comprise a build platform and/or actuator. The build platform may start in close proximity to the window at the beginning of a method described herein. A substrate (e.g., flexible substrate, fabric) may be adhered to the build platform or held in contact with a surface of the build platform in tension, or the substrate (e.g., flexible substrate, fabric) may be held in tension in the absence of a build platform. The method may involve photopolymerizing the resin to the substrate (e.g., flexible substrate, fabric) so that a polymerized structure from the resin adheres to the substrate (e.g., flexible substrate, fabric). The actuator may then move the platform in a direction perpendicular to the window's surface as photopolymerization continues so that a structure can be built up in height from a surface of the substrate (e.g., flexible substrate, fabric) to form a three dimensional shape.

In some embodiments, components of the system may be provided such that flexible substrate (e.g., flexible substrate, fabric) can be rolled through a build area in an inline process are provided. In some embodiments, the system may comprise rollers (e.g., FIG. 1B; e.g., motorized rollers, e.g., FIG. 1C).

A polymeric structure polymerized onto a woven fabric, which polymeric structure is partially entwined in the fabric weave or knit, may result from a bath photopolymerization method described herein. As non-limiting examples, at least a portion of a shoe upper, sports bra, t-shirt, or other apparel, belts, or other textured fabrics may be made using a bath photopolymerization method described herein.

According to another aspect, a method of forming a structure on a pre-existing substrate (e.g., textile, leather, plastic) involving a powder bed is provided.

The powder bed method may involve covering a surface of the substrate (e.g., fabric, textile) with a layer of polymeric powder. In some embodiments, the layer of polymeric powder has a thickness of between or equal to 10 microns and 500 microns. Covering may comprise spreading the layer of polymeric powder over the surface of the substrate (e.g., flexible substrate, fabric). The method may involve placing the surface of the substrate (e.g., flexible substrate, fabric) onto a build platform before covering the surface of the substrate (e.g., flexible substrate, fabric) with the thin layer of polymeric powder. The powder bed method may involve placing a substrate (e.g., fabric, textile, leather) on a base (e.g., build platform) and then covering the substrate (e.g., flexible substrate, fabric) with a layer of polymeric powder before sintering and/or fusing and/or binding the layer.

The powder bed method may involve directing electromagnetic radiation (e.g., light) toward one or more regions on the surface of the substrate (e.g., flexible substrate, fabric) to heat the polymeric powder to form a layer on the surface of the substrate (e.g., flexible substrate, fabric). Directing electromagnetic radiation (e.g., light) may involve patterning the electromagnetic radiation (e.g., light). In some embodiments, heating comprises sintering (e.g., selective laser sintering (SLS)) and/or fusing (e.g., multi-jet fusion technology). The powder bed method may involve directing the electromagnetic radiation (e.g., light) locally through a focused laser beam, or directing electromagnetic radiation (e.g., light) globally through an unfocused electromagnetic radiation source (e.g., light source), and depositing a fusing agent locally that may absorb the global electromagnetic radiation source (e.g., light source) locally. Suitable fusing agents may absorb the global electromagnetic radiation source (e.g., light source) efficiently and transfer heat to the polymeric powder. The powder bed method may involve directing electromagnetic radiation (e.g., light) from an electromagnetic radiation source (e.g., light source) toward one or more regions on a surface of a substrate (e.g., flexible substrate, fabric). The electromagnetic radiation source (e.g., light source) may be a laser, a lamp, or another suitable electromagnetic radiation source (e.g., light source). The powder bed method may involve exposing a top surface of the polymeric powder to electromagnetic radiation (e.g., light) energy using an electromagnetic radiation source (e.g., light source, e.g., a lamp, a laser). In some embodiments, the powder bed method involves selectively sintering polymeric powder on one or more regions of the substrate (e.g., flexible substrate, fabric), each region in some embodiments between or equal to 0.25 mm$^2$ and 1 m$^2$ in area, by exposing the regions to an intense laser beam, and involves no jetting of any liquids (e.g., carrying a polymeric binder of a fusing agent; e.g., a selective laser sintering method). Sintering the powder may heat the substrate (e.g., flexible substrate, fabric) locally and cause bonding between the substrate (e.g., flexible substrate, fabric) and the sintered powder.

The powder bed method may involve jetting a liquid comprising a material onto a layer of powder that is positioned on top of a textile. The method may comprise jetting a fusing agent into the polymeric powder (e.g., multi-jet fusion technology). The fusing agent may be used to absorb electromagnetic radiation (e.g., light) locally and cause the polymeric powder to heat up, in an illuminated region comprising the fusing agent, so that particles in the powder fuse together into a solid only in illuminated regions where the fusing agent was jetted. In some illustrative embodiments, the powder bed method may involve positioning the substrate (e.g., flexible substrate, fabric) on a build platform, spreading a layer of polymeric powder over a substrate (e.g., flexible substrate, fabric), and then jetting a fusing agent into the polymeric powder. In some embodiments, the layer of polymeric powder has a thickness of between or equal to 10 microns and 500 microns. In some embodiments, the method comprises jetting a fusing agent in selected regions of the polymeric powder and then exposing the whole area to an electromagnetic radiation source (e.g., light source, e.g., lamp). In some embodiments, the powder bed method may involve jetting a polymeric binder (e.g., a binder jetting method) into the polymeric powder, which polymeric binder functions to glue the particles together, so no illumination or heating is needed. Colored pigments may be jetted into the polymeric powder such that the color of the printed structures may be customized. A detailing agent may be jetted around external surfaces of the structures such that a smoother surface finish can be obtained.

After a first layer is made using some steps in a powder bed method described herein, the steps can be carried out in the same way to build a layer onto the previous layer, to build up 3D structures that are directly bonded to the substrate (e.g., flexible substrate, fabric). The method may involve covering (e.g., by dragging and leveling new powder) a previous layer with a new layer of powder, and repeating jetting a material (e.g., fusing agent) and/or illumination. The method may involve cyclically covering a previous layer of powder with a new layer of powder, and directing electromagnetic radiation (e.g., light) toward one or more regions on the surface of the layer to heat the polymeric powder and form a layer on the previous layer, building up a three-dimensional structure on a substrate (e.g., flexible substrate, fabric) one layer at a time.

In some illustrative embodiments, the powder bed method involves placing the substrate (e.g., flexible substrate, fabric) (e.g., textile, leather) on a base, e.g., into a tray or onto a build platform. The method may comprise scraping a layer of polymeric powder onto the surface of substrate (e.g., flexible substrate, fabric), such that the substrate (e.g., flexible substrate, fabric) is embedded with the powder and the top-most points of the substrate (e.g., flexible substrate, fabric) are roughly flush with the top surface of the powder bed (e.g., for woven fabrics). The method may involve jetting a liquid comprising a material including but not limited to one or more colored pigments, one or more binders (e.g., a binder jet process) and/or one or more fusing agents (e.g., a multi-jet fusion process), or none of these (e.g., an SLS process). The method may then involve exposing one or more regions of the substrate (e.g., flexible substrate, fabric) (or of the polymer powder layer) to energy from an energy source to drive sintering and/or fusion, e.g., from a concentrated laser beam (e.g., in an SLS process), and/or a wide exposure area lamp (e.g., in a multi-jet fusion process). The method may not involve exposing any regions of the substrate (e.g., flexible substrate, fabric) to energy to drive sintering (e.g., in a binder jet process). Once a first layer has been formed on the substrate (e.g., flexible substrate, fabric), the method may then involve moving the build platform relative to the energy source, e.g., lowering the build platform and/or raising the electromagnetic radiation source (e.g., the light source) used to drive sintering and/or fusion. The method may involve scraping a layer of polymer powder over the top of the previous layer. The method may involve cyclically jetting a liquid comprising a material, exposing at least the top layer to electromagnetic radiation (e.g., light), moving the build platform relative to the energy source, and scraping a layer of polymer powder over the top of the previous layer, repeating until the designed three-dimensional structure has been built. Following forming a three-dimensional structure using steps in a powder bed method described herein, the method may involve removing the substrate (e.g., flexible substrate, fabric) (e.g., with a 3D structure printed on it) from the powder bed and removing excess powder, e.g., with compressed air and/or mechanical agitation.

The method may involve executing an exposure process that causes the powder to retain a solid shape that is larger than the average particle size of the powder, where that larger solid shape is adhered to the textile or polymeric film without the use of adhesives. The method may involve using different exposure settings for the first layer, relative to other layers made by the method, to ensure that the powder is fully melted and/or well adhered to the textile or polymeric film.

Articles made by a powder bed method described herein include but are not limited to shoe uppers, sports bras, t-shirts and apparel, and/or textured textile handling belts.

According to another aspect, a method involving depositing an ultraviolet (UV)-curable material onto a substrate (e.g., flexible substrate, fabric) by a valve jetting process is provided.

In some embodiments, the valve jetting process comprises moving a needle upwards in a nozzle to fill the nozzle at least partially with the UV-curable material from a reservoir, and forcing the needle downwards to extrude the UV-curable material through the nozzle and onto the substrate (e.g., flexible substrate, fabric). In some embodiments, the UV-curable material filling the nozzle is from an active mixing chamber. In some embodiments, the valve jetting process is pneumatic. In some embodiments, the valve jetting process is piezoelectric.

In some embodiments, the needle is at least partially disposed within the nozzle.

In some embodiments, the reservoir is fluidly connected with and upstream of the nozzle. In some embodiments, the reservoir comprises a pressurized air reservoir. In some embodiments, the reservoir comprises a mixing chamber and an impeller disposed in the mixing chamber, and the method further comprises mixing the UV-curable material in the active mixing chamber before moving the needle upwards in the nozzle.

In some embodiments, the method involves depositing a layer of the UV-curable material onto the substrate (e.g., leather, textile, polymer film) by a valve jetting process. In some embodiments, the method involves depositing a second layer of UV-curable material onto the substrate (e.g., flexible substrate, fabric) by a valve jetting process.

In some embodiments, the method involves exposing the UV-curable material to UV light to at least partially cure the UV-curable material. In some embodiments, exposing the UV-curable material to UV light comprises shining a UV light emitting diode (LED) onto the UV-curable material after it exits the nozzle.

In some embodiments, the method may use a pneumatic or piezoelectric valve jetting process to deposit silicones, polyurethanes, epoxies, and/or other reactive systems onto a substrate (e.g., fabric, e.g., textile) in a layer. Deposition may be followed by electromagnetic radiation-curing (e.g., UV-curing) the reactive system(s) to at least partially cure the layer before depositing a next layer.

In some embodiments, the UV-curable material that is jetted comprises a UV-curable resin, a UV-curable silicone, a partially reacted reactive polyurethane, a thiolene resin, or a one part latent heat-curing resin (e.g., a 1K polyurethane or a 1 k silicone), or any suitable combination thereof.

In some embodiments, the substrate (e.g., fabric, e.g., textile) comprises a shoe upper. In some embodiments, the substrate (e.g., fabric, e.g., textile) comprises a portion of an article of apparel.

In some embodiments, a system to support a method including a valve jetting process may have a valve jet alongside a UV LED for curing the material after it exits the valve jet.

In some embodiments, a system to support a method including a valve jetting process for forming a structure on a substrate (e.g., flexible substrate, fabric) comprises a first nozzle, a needle at least partially disposed within the first nozzle, a material reservoir connected with and upstream of the first nozzle, and a second nozzle connected with and downstream of the material reservoir; the second nozzle comprising a mixing chamber and an impeller disposed within the mixing chamber, wherein the second nozzle connects the material reservoir with the first nozzle.

In some embodiments, a system to support a method including a valve jetting process for forming a structure on a substrate (e.g., flexible substrate, fabric) comprises a nozzle, a needle at least partially disposed within the nozzle, a material reservoir fluidly connected with the nozzle, and an electromagnetic radiation source (e.g., a light source) adjacent to the nozzle, wherein an outlet of the electromagnetic radiation source (e.g., light source) faces in the same direction as an outlet of the nozzle. In some embodiments, the same direction is parallel. In some embodiments, the same direction comprises at least one axis of electromagnetic radiation (e.g., light) emitted from the electromagnetic radiation source (e.g., light source) intersecting at least one axis of material output through the nozzle. In some embodiments, the electromagnetic radiation source (e.g., light source) is an ultraviolet light source.

Turning now to the figures, several non-limiting embodiments are described in further detail. However, it should be understood that the current disclosure is not limited to only those specific embodiments described herein. Instead, the various disclosed components, features, and methods may be arranged in any suitable combination as the disclosure is not so limited.

FIG. 1A is a schematic of an apparatus for photopolymerization onto a substrate (e.g., flexible substrate, fabric), according to certain embodiments. In some embodiments, electromagnetic radiation (e.g., light) is directed from a projector in a pattern through a window to polymerize structures onto a substrate (e.g., flexible substrate, fabric) submerged in a resin bath with a gap between a surface of the substrate (e.g., flexible substrate, fabric) and a surface of the window. The substrate (e.g., flexible substrate, fabric) in FIG. 1A is attached to a build platform, and a linear actuator may be used to move the substrate (e.g., flexible substrate, fabric) away from the surface of the window, increasing the gap to build up a three-dimensional polymerized structure one layer at a time onto the substrate (e.g., flexible substrate, fabric).

Figure 1B:
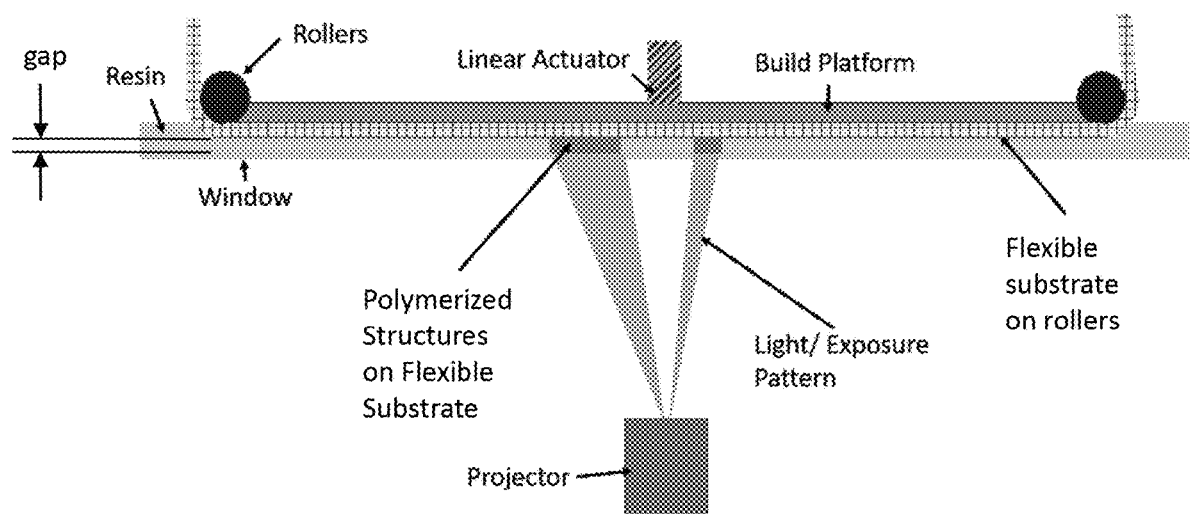
FIG. 1B is a schematic of an apparatus for photopolymerization onto a flexible substrate in an inline process, according to certain illustrative embodiments.

FIG. 1B is a schematic of an apparatus for photopolymerization onto a flexible substrate (e.g., flexible substrate, fabric) in an inline process, according to certain embodiments. In some embodiments, the flexible substrate (e.g., flexible substrate, fabric) is held in tension onto the build platform and rollers move the flexible substrate (e.g., flexible substrate, fabric) along so as to expose different regions of the flexible substrate (e.g., flexible substrate, fabric) to the resin bath over time.

Figure 1C:
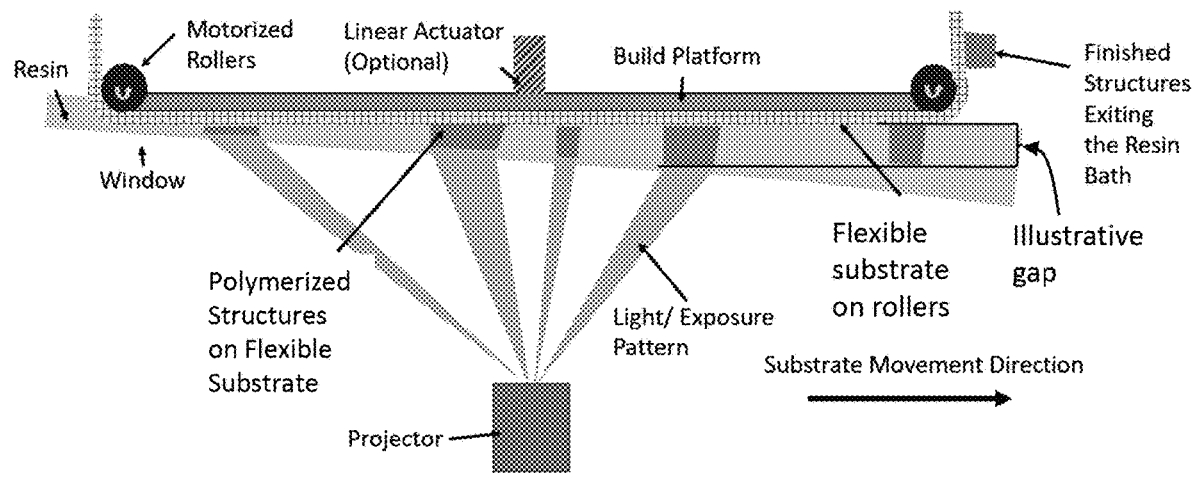
FIG. 1C is a schematic of an apparatus for photopolymerization onto a flexible substrate in an inline process, according to certain illustrative embodiments.

FIG. 1C is a schematic of an apparatus for photopolymerization onto a flexible substrate (e.g., flexible substrate, fabric) in an inline process, according to certain embodiments. In some embodiments, the window at the base of the bath is angled so that a gap between a surface of the window and a surface the flexible substrate (e.g., flexible substrate, fabric) varies along at least one axis of the flexible substrate (e.g., flexible substrate, fabric), and the flexible substrate (e.g., flexible substrate, fabric) may be moved along the angled axis by rollers (e.g., motorized rollers) so that polymerized structures may be built continuously layer by layer onto the flexible substrate (e.g., flexible substrate, fabric).

Figure 2A:
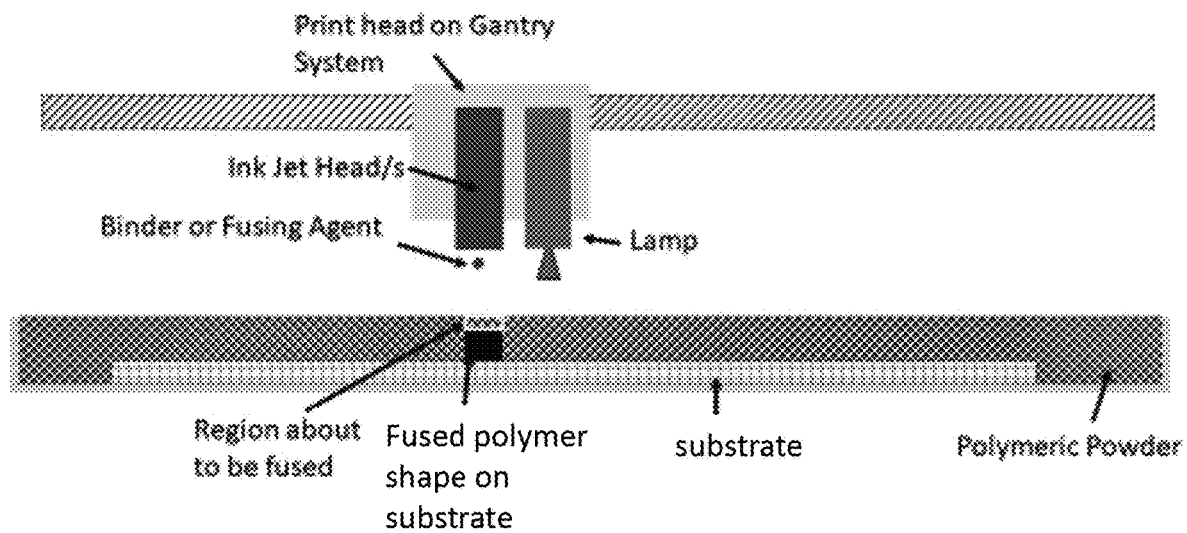
FIG. 2A is a schematic of an apparatus for forming structures on substrate using a multi-jet fusion process, in accordance with certain illustrative embodiments.

FIG. 2A is a schematic of an apparatus for forming structures on a substrate (e.g., flexible substrate, fabric) using a multi-jet fusion process, in accordance with certain illustrative embodiments. In some embodiments, polymeric powder coats a surface of the substrate (e.g., flexible substrate, fabric). A print head may move along a gantry system along one or more dimensions (e.g., two dimensions, three dimensions) to selectively deposit a liquid (e.g., binder, fusing agent, pigment) onto one or more regions of the polymeric powder layer, and/or to selectively fuse one or more regions of the polymeric powder layer using the lamp in regions where fusing agent was deposited. In FIG. 2A, one or more polymeric powder layers have already been deposited, and one or more regions in sublayer(s) to a top polymeric powder layer have already been fused or bound (e.g., FIG. 2A, fused polymer shape on substrate (e.g., flexible substrate, fabric)).

Figure 2B:
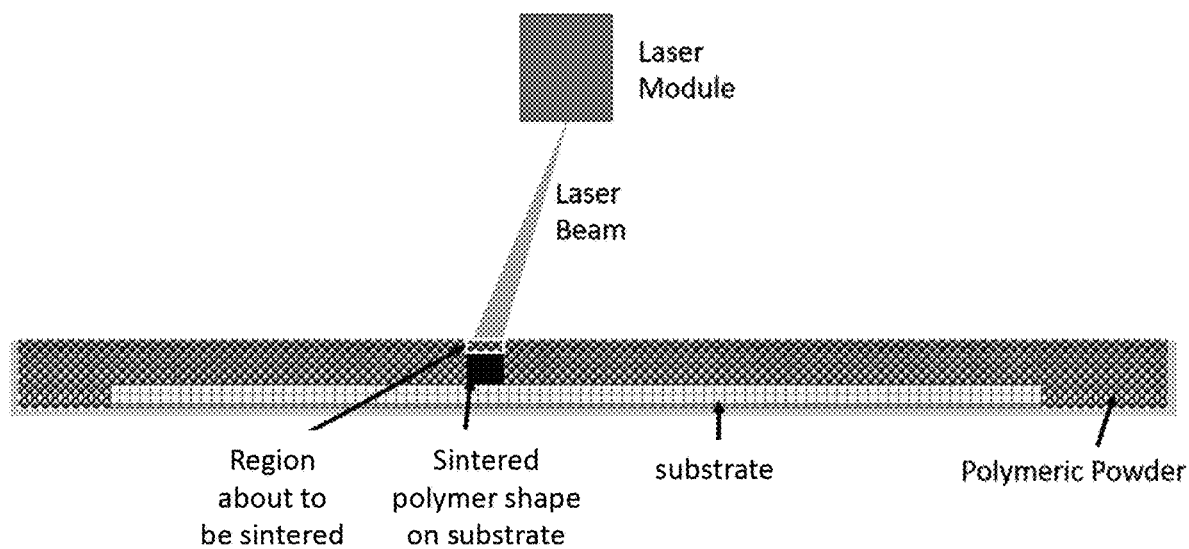
FIG. 2B is a schematic of an apparatus for forming structures on substrate (e.g., textile, leather) using a selective laser sintering (SLS) process, in accordance with certain illustrative embodiments.

FIG. 2B is a schematic of an apparatus for forming structures on a substrate (e.g., flexible substrate, fabric) (e.g., textile, leather) using a selective laser sintering (SLS) process, in accordance with certain illustrative embodiments. In some embodiments, polymeric powder coats a surface of the substrate (e.g., flexible substrate, fabric) and a laser module selectively irradiates one or more regions of the polymeric powder layer with a laser beam to sinter the one or more regions. In FIG. 2B, one or more polymeric powder layers have already been deposited, and one or more regions in sublayer(s) to a top polymeric powder layer have already been sintered (e.g., FIG. 2B, sintered polymer shape on substrate (e.g., flexible substrate, fabric)).

Figure 3A:
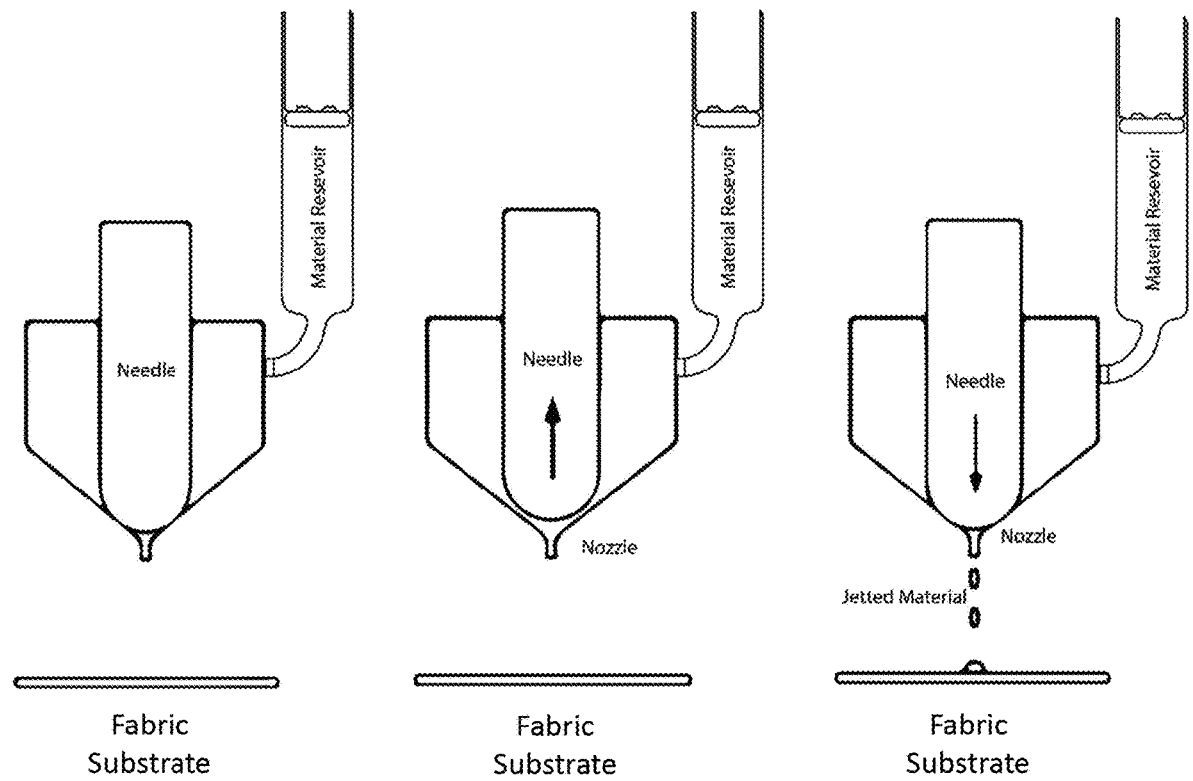
FIG. 3A is a schematic of a valve jetting process, in accordance with certain illustrative embodiments.

FIG. 3A is a schematic of a valve jetting process, in accordance with certain illustrative embodiments. FIG. 3A shows how valve jetting may be used to deposit droplets onto fabric (e.g., textile) substrates. In the left-most image of FIG. 3A, the needle is blocking the nozzle, at least partially preventing material from being forced into the nozzle. In the center image, the needle is moved up, and material from the pressurized air material reservoir fills the area where the needle was. In the right-most image of FIG. 3A, the needle is forced back down, which ejects material through the nozzle and onto a fabric substrate. The material may be electromagnetic radiation-curable (e.g., UV-curable) and the apparatus may further include an electromagnetic radiation source (e.g., light source, e.g., UV light source) adjacent to the nozzle to cure the material as/after it exits the nozzle.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be illustrative and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for forming a three-dimensional structure, the method comprising:
   bringing one or more surfaces of a substrate into contact with a resin that is at least in part electromagnetic radiation-curable, by jetting said resin onto said substrate using a valved nozzle;
   patterning electromagnetic radiation from a radiation source and through a window into the resin to polymerize the resin onto the substrate, wherein the radiation source is positioned above or below the resin; and
   continuing to pattern electromagnetic radiation into the resin to form a three-dimensional structure while simultaneously translating the substrate with respect to the electromagnetic radiation source in a translation direction, wherein the window is angled such that a gap between the window and the surface of the substrate increases in the translation direction.

2. The method of claim 1, wherein the substrate is a textile.

3. The method of claim 1, wherein the substrate is a belt.

4. The method of claim 1, comprising positioning a blade so that the blade is configured to separate the three-dimensional structure from the substrate as the substrate is translated.

5. The method of claim 1, comprising translating the substrate in a loop such that the method repeats on at least a portion of the substrate.

* * * * *